United States Patent
Kolodziej et al.

(10) Patent No.: US 6,568,692 B2
(45) Date of Patent: May 27, 2003

(54) LOW STRESS SEAL

(75) Inventors: Michael J. Kolodziej, Phoenix, AZ (US); Raymond Hemmele, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 11 days.

(21) Appl. No.: 09/798,567

(22) Filed: Mar. 2, 2001

(65) Prior Publication Data

US 2002/0121747 A1 Sep. 5, 2002

(51) Int. Cl.[7] .................. F16L 17/06; F16L 17/025; F16J 15/02; F01F 7/00; F01D 25/26
(52) U.S. Cl. .................. 277/614; 277/626; 277/647; 415/135
(58) Field of Search .................. 277/604, 609, 277/614, 626, 643, 644, 647, 648, 500, 586, 628; 415/135, 136, 138, 139, 173.1, 173.3, 173.5, 209.2, 209.3

(56) References Cited

U.S. PATENT DOCUMENTS

| | | | | |
|---|---|---|---|---|
| 2,211,983 A | * | 8/1940 | Parris | 277/614 |
| 2,991,045 A | * | 7/1961 | Tassoni | |
| 3,204,971 A | | 9/1965 | Meriano | |
| 3,520,544 A | * | 7/1970 | Taylor | 277/612 |
| 4,013,373 A | * | 3/1977 | Lamprecht et al. | 220/320 |
| 4,336,943 A | * | 6/1982 | Chaplin | 277/643 |
| 4,477,086 A | | 10/1984 | Feder et al. | |
| 4,537,024 A | * | 8/1985 | Grosjean | 415/139 |
| 4,915,397 A | * | 4/1990 | Nicholson | 277/645 |
| 5,158,430 A | * | 10/1992 | Dixon et al. | 415/134 |
| 5,338,152 A | | 8/1994 | Feldmann | |
| 5,484,342 A | * | 1/1996 | Beck | 474/254 |
| 5,526,751 A | * | 6/1996 | Spivey et al. | 102/341 |
| 5,669,612 A | | 9/1997 | Nicholson | |
| 5,730,445 A | * | 3/1998 | Swensen et al. | 277/608 |
| 5,799,954 A | * | 9/1998 | Layer | 277/614 |
| 5,833,140 A | * | 11/1998 | Loffredo et al. | 239/265.37 |
| 5,975,844 A | * | 11/1999 | Milazar et al. | 277/643 |
| 6,120,037 A | | 9/2000 | Schmertz | |
| 6,193,240 B1 | * | 2/2001 | Johnson et al. | 277/643 |
| 6,199,871 B1 | * | 3/2001 | Lampes | 277/614 |
| 6,358,000 B1 | * | 3/2002 | Veronesi et al. | 415/134 |

* cited by examiner

Primary Examiner—Anthony Knight
Assistant Examiner—Vishal Patel
(74) Attorney, Agent, or Firm—Robert Desmond, Esq.

(57) ABSTRACT

A low stress seal seals boundaries between rotor sections of a turbofan engine. The low stress seal includes rounded feet on the ends of legs, which rounded feet cooperate with rounded interior corners within a seal groove. The elimination of sharp interior corners reduces stress and prevents the fatigue failures.

20 Claims, 3 Drawing Sheets

LOW STRESS SEAL

BACKGROUND OF THE INVENTION

The present invention relates to turbofan jet engines and, more particularly, to seals used to separate a high-pressure flow near the center of the engine from a lower pressure flow surrounding the former flow.

Modern aircraft use turbofan jet engines to increase efficiency and reduce noise as compared to turbojet engines. While the former engines provide these desirable results, turbofan engines also add some complexity to engine design. The rotating assembly of turbojet engines includes a high pressure compressor comprising a set of rotors that compresses a core flow of air that passes through the high pressure compressor. Some of the compressed air is bled off into a secondary cooling flow that is used to cool hotter parts of the engine. The secondary cooling flow is contained in a cooling flow cavity that is proximal to the spin axis of the rotor, and between the spin axis and the core flow.

Known turbofan engines comprise cases and rotors constructed in sections. For example, U.S. Pat. No. 5,338,152 issued Aug. 16, 1994 for "Arrangement for Sealing Structural Members Using a V-Shaped Insert, Particularly in the Case of Turbo-Engines" describes such a seal used at the boundary between the case sections of a turbo-engine. The seal described in the '152 patent resides in a groove in a structural member. The groove includes sharp interior corners and the seal includes legs that angle into the corners. Such sharp corners and legs provide an adequate seal and work well in stationary structures such as engine cases.

However, due to the pressure differential between the core flow at the entry to the high pressure compressor and the secondary cooling flow at a high pressure, seals are also required at some of the boundaries between rotor sections. A known seal design, for use at such boundaries, has a "V" cross-section. A seal seat comprises a rectangular groove which straddles the boundary between rotor sections. The groove is on the surface of the cooling flow cavity facing inwardly toward the rotor spin axis, and has sharp (90 degree) interior corners. The ends of the legs of the "V" angle into the sharp interior corners of the rectangular seat.

Exemplary of the foregoing, as shown in FIG. 1, includes curvic teeth 18 that join the rotors. A seal 27 is seated in rectangular groove 28 that straddles the curvic teeth 18. The rectangular groove 28 includes sharp interior corners 29a and 29b. The seal 27 includes a first straight leg 30a and a second straight leg 30b, wherein the first straight leg 30a and the second straight leg 30b angle into the interior corners 29a and 29b. No feet are provided at the ends of the legs 30a and 30b. The rotor spins at over 25,000 RPM, and the resulting centrifugal force on the interior corners 29a and 29b by the straight legs 30a and 30b causes wear leading to fatigue failures at the interior corners 29a and 29b.

As can be seen, there is a need for a new seal design that reduces stress on the groove corners, and prevents the resulting failures.

SUMMARY OF THE INVENTION

In one aspect of the present invention, a low stress seal is useable between sections of a rotating assembly. The seal comprises an apex; a first leg and a second leg, wherein the first leg and the second leg extend away from the apex on each side of the apex; a first foot at the end of the first leg; and a second foot at the end of the second leg, wherein the first foot and the second foot are rounded. A first volume and a second volume extend through the sections, wherein the first volume is proximal to the spin axis of the rotating assembly, a boundary between the sections is on a surface of the first volume, the surface faces the spin axis, and the surface faces away from the second volume. A first seal seat and a second seal seat are defined on the surface, wherein the first seal seat and the second seal seat are on opposite sides of the boundary between the sections, and the first foot and the second foot cooperate with the first seal seat and the second seal seat to prevent a flow from the first volume to the second volume.

In a second aspect of the present invention, a method for reducing stress in a seal groove at a boundary between rotors in a compressor of a turbofan engine comprises providing seal seats with rounded cross-sections, wherein the seal seats are within the seal grooves and the seal seats straddle the boundary between the rotors; providing a seal with rounded feet, wherein the seal includes an apex, a first leg extends from one side of the apex, a second leg extends from the other side of the apex, and the feet extend from the ends of the legs, wherein the feet are rounded inwardly and the feet cooperate with the seal seats to provide a pressure seal; and inserting the seal into the groove.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Further, while the present invention is described in the context of a compressor for a turbofan engine, the present invention is not so limited. In general, the present invention may be used between any axially stacked members of rotating assemblies that may require pressure to be sealed. As an example, the present invention may be used in a variety of turbine engines.

Figure 1:
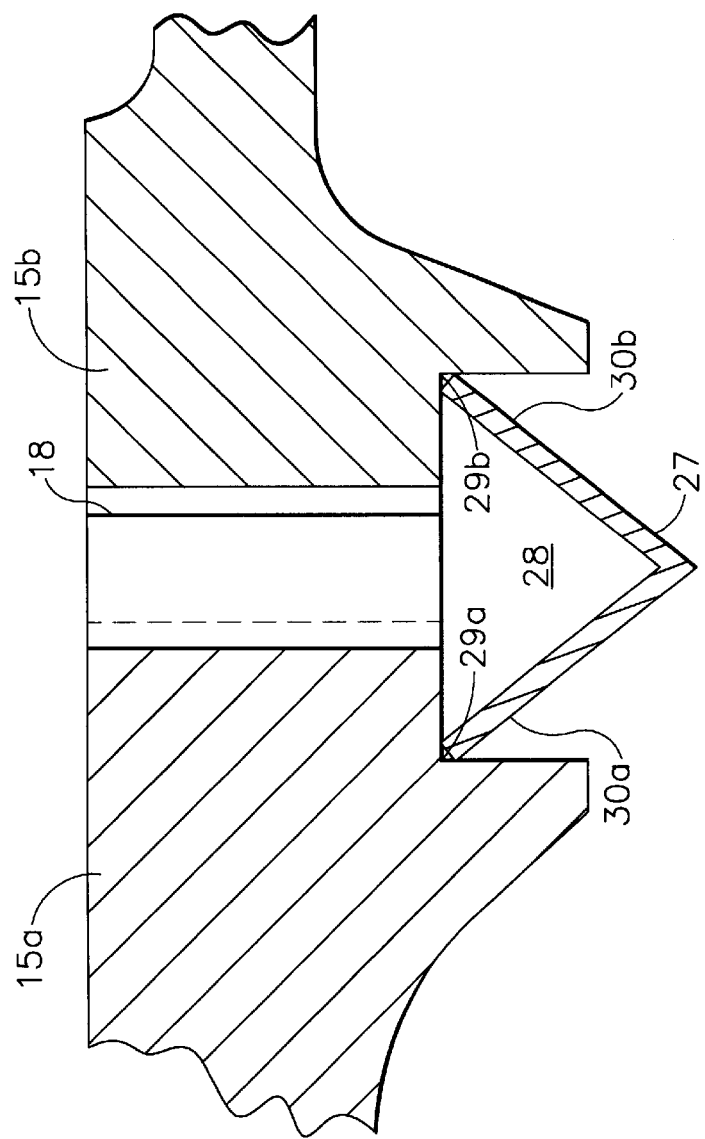
FIG. 1 shows a prior art V-seal used in known turbofan engines.
Figure 2:
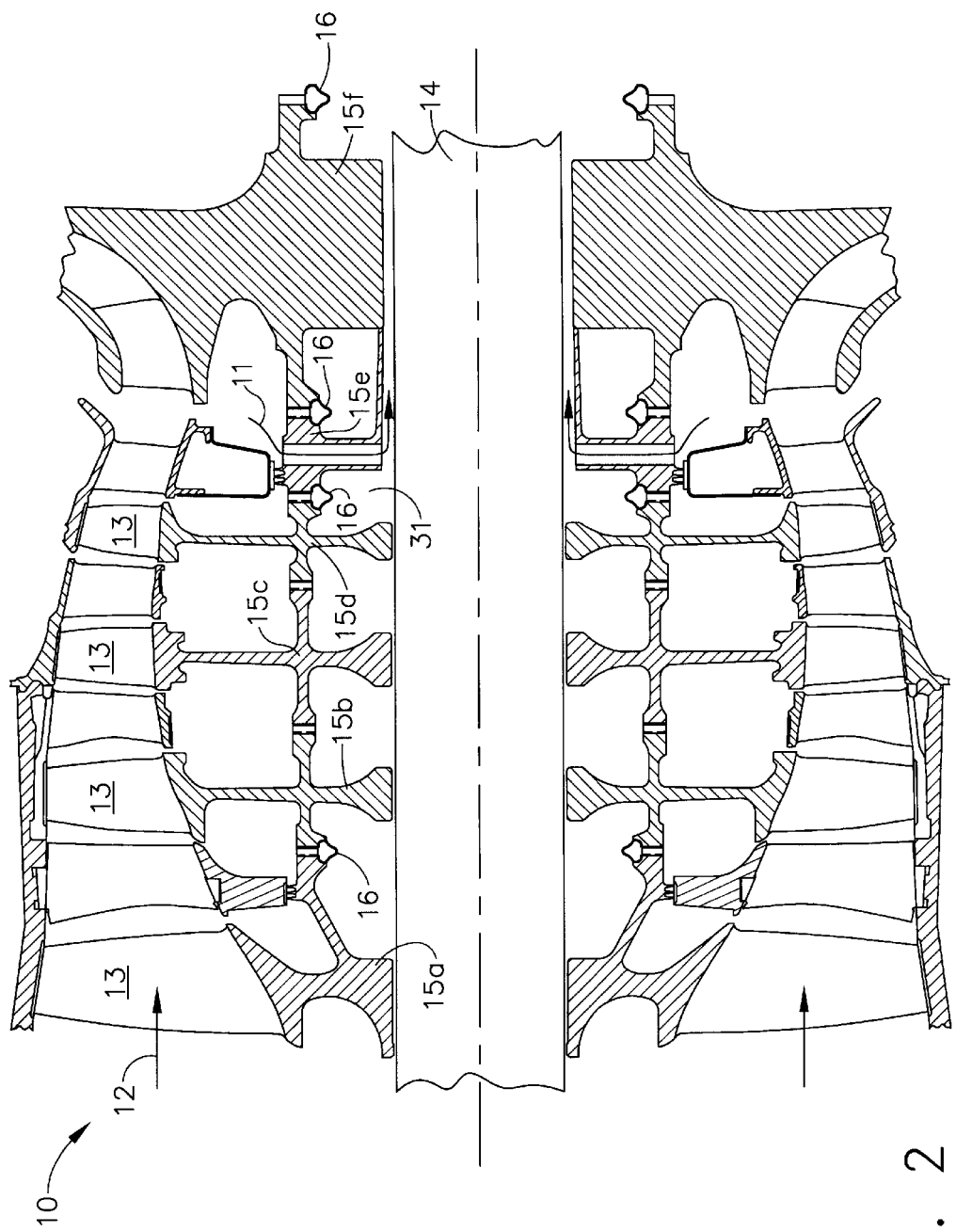
FIG. 2 shows a cross-sectional view of a high pressure compressor of a turbofan jet engine, with an arrow indicating the core flow through the high pressure compressor.

A cross-section of a high pressure compressor 10 of a turbofan engine is shown in FIG. 2. The cross-section in FIG. 2 is vertically symmetric, and labels are omitted on elements in the bottom half of FIG. 2 to reduce its complexity. The high pressure compressor 10 has a core flow 12 of air that is compressed as the core flow 12 passes through the high pressure compressor 10. A compressor rotor of the high pressure compressor 10 shown in FIG. 2 may be constructed from rotor sections 15a, 15b, 15c, 15d, 15e, and 15f assembled on a tieshaft 14. The tieshaft 14 includes nuts, or other fittings, at each end and the rotor sections 15a–15f are forced together by the nuts. Passages in rotor section 15e allow some of the core flow 12 to be bled off into a secondary cooling flow 11, after the core flow 12 has been compressed in the high pressure compressor 10. The secondary cooling flow 11 is contained in the cooling flow cavity 31 and is used to cool hotter parts of the engine. The cooling flow cavity 31 is proximal to the spin axis of the rotor, and is between the spin axis and the core flow 12. At the boundary between rotor sections 15a and 15b, a pressure differential exists between the secondary cooling flow 11 (high pressure) and the core flow 12 (low pressure), and a seal 16 is required at this boundary to prevent gasses from escaping from the secondary cooling flow 11 to the core flow 12. The seal 16 may also be used to seal boundaries between rotor sections 15d and 15e, rotor sections 15e and 15f, and rotor section 15f and the following section.

Figure 3B:
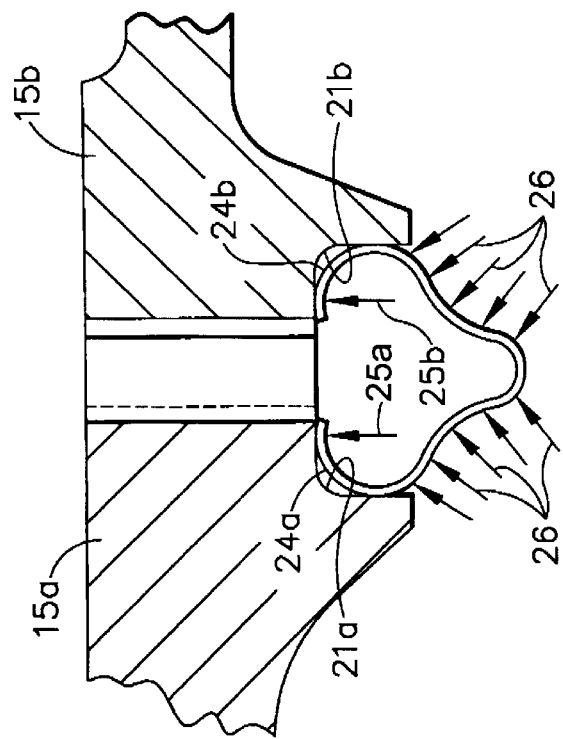
FIG. 3B depicts a seal according to the present invention seated in the seal groove at the boundary between rotors when the compressor is operating.
Figure 3A:
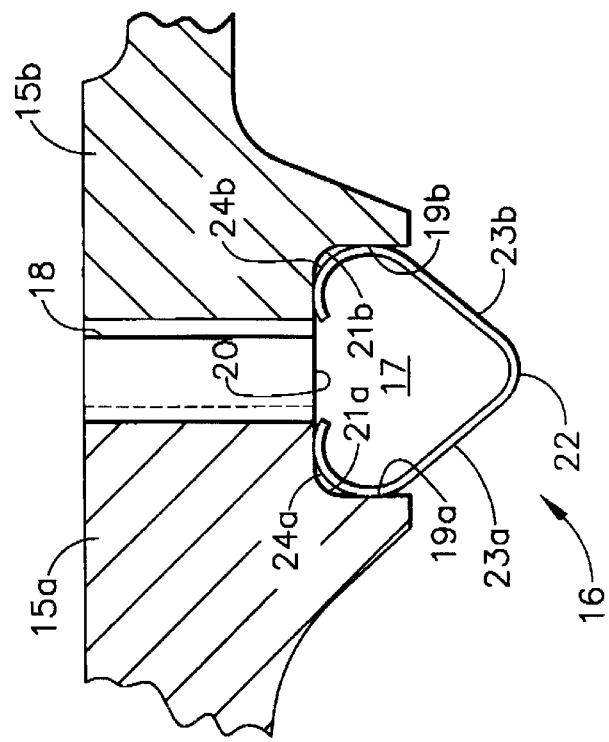
FIG. 3A shows a seal according to the present invention that is seated in a seal groove at the boundary between rotors in a non-operating compressor.

A detailed view of a sealing system having the seal 16 residing in a seal groove 17 is shown in FIG. 3A. Here, the seal 16 is shown as it may appear when the high pressure compressor 10 is not in operation. Curvic teeth 18 join the rotors and provide for both the transmission of torque between rotors, and allow for limited motion of the rotors relative to the adjacent rotor. The seal groove 17 straddles the boundary between rotors and is substantially rectangular in cross section. Although the dimensions can vary, the seal groove 17 is typically about 0.10 to 0.30 inches deep and about 0.30 to 0.60 inches wide. The seal groove 17 may include a first side 19a opposite a second side 19b, a base 20 between the first and second sides 19a and 19b, a first seal seat 21a between the first side 19a and the base 20, and a second seal seat 21b between the second side 19b and the base 20. The base 20 may be substantially orthogonal to the boundary between the rotors 15a–15f. The seal seats 21a, 21b are preferably rounded or curved to eliminate the fatigue failures that result from seal seats with sharp corners. Radii of the first and second seal seats are preferably smaller than the radii of a first foot 24a and of a second foot 24b described below.

The seal 16 may preferably comprise an apex 22, a first leg 23a on one side of the apex 22, and a second leg 23b on the other or second side of the apex 22. A first foot 24a is adjacent the first leg 23a and a second foot 24b is adjacent the second leg 23b. Each of the foregoing sections or components of the seal 16 smoothly transitions into the adjacent section, i.e., there are no sharp corners. Consequently, the apex 22 may be preferably rounded or curved to both reduce the stress level in the apex 22 and to simplify manufacturing the seal 16. A typical radius of the apex 22 is about 0.030 to 0.060 inches, although the dimensions can vary for the specific application. Also, even though the apex 22 is described above as having a radius, the present invention contemplates that the apex 22 may have a varying radius and may not comprise an arc of an exact circle.

The legs 23a and 23b preferably extend away from the apex 22 forming a "V". The first foot 24a is at a free end of the first leg 23a, and the second foot 24b is at a free end of the second leg 23b. The first foot 24a may preferably be rounded or curved inwardly towards the second foot 24b, and the second foot 24b may preferably be rounded or curved inwardly towards the first foot 24a. In order to avoid catching the free end of either the first foot 24a or the second foot 24b on the curvic teeth 18, the first foot 24a and the second foot 24b may continue their free curved ends past the first seal seat 21a and the second seal seat 21b, respectively. Thus, the free ends of the first foot 24a and the second foot 24b separate or extend away from the seal groove 17 and curl into an inside of the seal 16.

While the specific dimensions can be varied, the cross section of the seal 16 may typically be about 0.30 to 0.50 inches high and about 0.30 to 0.60 inches wide. The length of the legs 23a and 23b may preferably be of the same length (and can be of different lengths if desired) and typically about 0.10 to 0.60 inches. An angular separation of the legs 23a and 23b can typically be between about 60 to 135 degrees. The first foot 24a and the second foot 24b may have the same or a different radius, such as between about 0.030 to 0.060 inches. Yet, even though the first foot 24a and the second foot 24b can be generally described in terms of a radius, it can be seen from FIG. 3A that they may comprise a part of a polygon with straight sides that generally provide an overall rounded configuration. The free ends of the first foot 24a and the second foot 24b may preferably separate from a surface of the seal groove 17 adjacent the teeth 18 by about 0.01 to 0.05 inches and/or at an angle of about 5 to 60 degrees.

The shape of the seal 16, when the high pressure compressor 10 is operating, is shown in FIG. 3B. There are two forces effecting the shape of the seal 16. The rotor of the compressor 10 spins at a high spin rate and, as a result, the first foot 24a may be forced against the first seal seat 21a by a first centrifugal force 25a and/or the second foot 24b may be forced against the second seal seat 21b by a second centrifugal force 25b. Further, due to the pressure differential between the secondary cooling flow 11 and the core flow 12, there is a uniform pressure 26 on the seal 16. The result of these forces causes the seal 16 to slightly deform as shown in FIG. 3B. These forces may combine to push the first foot 24a into the first seal seat 21a and/or the second foot 24b into the second seal seat 21b, thus providing a sealing force proportional to the pressure differential between the secondary cooling flow 11 and the core flow 12.

As mentioned above, other shapes for low stress seals 16 will be apparent to those skilled in the art and be within the intended scope of the present invention. For example, an arced seal could provide similar behavior as the "V" shaped seal 16 and, thus, come within the scope of the present invention. The seal groove and the seal seats may likewise depart from the above description without departing from the scope of the present invention. Any seal seat including a similar curved sealing surface to reduce stress is intended to come within the scope of the present invention.

It should be understood, of course, that the foregoing relates to preferred embodiments of the invention and that modifications may be made without departing from the spirit and scope of the invention as set forth in the following claims.

We claim:

1. A seal useable between a first section and a second section of a rotating assembly, the sections rotating about a spin axis, the sections having a seal groove with an opening facing inwardly towards the spin axis, the seal groove with a base straddling a boundary between the first section and the second section, the seal comprising:

a curved apex oriented towards the spin axis and curved towards an inside of the seal;

a first leg and a second leg each extending symmetrically away from both the apex and the spin axis on opposing sides of the apex;

a first foot and a second foot that are respectively at ends of the first leg and the second leg, wherein the first foot and the second foot curve toward the inside of the seal;

wherein the first leg and the second leg extend only linearly from the curved apex to the first foot and the second foot when said rotating assembly in a non-operating state; and wherein the first leg and the second leg curve inward toward the inside of the seal during an operational state.

2. The seal of claim 1 wherein the seal is V shaped.

3. The seal of claim 1, wherein the first foot and the second foot extend inwardly past an area where the first foot and the second foot respectively cooperate with the first seal seat and the second seal seat to seal the seal groove.

4. The seal of claim 3, wherein the first seal seat and the second seal seat are rounded.

5. The seal of claim 4, wherein radii of the first seal seat and the second seal seat are smaller than radii of the first foot and of the second foot.

6. The seal of claim 1, wherein the first foot and the second foot extend away form the base.

7. The seal of claim 6, wherein the seal groove is substantially rectangular.

8. The seal of claim 6, wherein the base is substantially orthogonal to the boundary.

9. The seal of claim 1, wherein the rotating assembly is a rotor of a turbofan engine.

10. A sealing system for sealing a boundary between sections of a rotating assembly, the assembly rotating about a spin axis, the sealing system comprising:

a seal groove having an opening facing inwardly towards the spin axis, the seal groove straddling the boundaries between the sections of the rotating assembly, the seal groove having a first rounded seal seat disposed between a first side and base portion of the seal groove disposed on one side of the boundary, and a second rounded seal seat disposed between a second side and another base portion of the seal groove on a second side of the boundary;

a seal in a V shaped cross-section, the seal having:

a rounded apex radially oriented about the spin axis such that the apex is rounded towards an inside of the seal;

a first leg and a second leg, both of equal lengths and that extend only linearly away from both the rounded apex and the spin axis, when the rotating assembly is in a non-operational state;

wherein the first leg and the second leg curve inward toward the inside of the seal during an operational state; and a first foot at an end of the first leg and a second foot at the end of the second leg, wherein the first foot and the second foot are rounded inwardly toward the apex, and wherein a first curved surface of the first foot and a second curved surface of the second foot cooperate with the first rounded seal seat and the second rounded seal seat, respectively.

11. The sealing system of claim 10, wherein the rotating assembly includes:

a first volume at a first pressure, and having a surface on which the seal groove is disposed; and a second volume at a second pressure different from the first pressure, wherein the seal acts to separate the two volumes.

12. The sealing system of claim 11, wherein the first volume is proximal to the spin axis of the rotating assembly, and wherein the second volume is distal from the spin axis of the rotating assembly, and wherein the first pressure is greater than the second pressure.

13. The sealing system of claim 11, wherein the rotating assembly is a rotor assembly of a turbofan engine.

14. The sealing system of claim 11, wherein the first volume is a cooling flow cavity.

15. The sealing system of claim 11, wherein the second volume is a core flow.

16. A method for reducing stress in a seal groove at a boundary between rotors rotating about a spin axis of a turbofan engine, comprising:

providing seal seats with rounded cross-sections, the seal seats being whithin the seal groove straddling the boundary between the rotors, the seal groove opening inwardly towards the spin axis, the seal groove comprising a radial portion and an axial portion of each of said rotors;

providing a V shaped seal having a curved apex that curves towards an inside of the seal, a first leg extending only linearly from one side of the apex during a non-operational state, a second leg extending only linearly from another side of the apex during a non-operational state, rounded feet that extend from ends of the legs, the rounded feet curve inwardly toward the inside of the seal, wherein the feet cooperate with the seal seats to provide a pressure seal, and wherein, the feet cooperate with the seal seats to provide a pressure seal, and wherein, during an operational state, the first leg and the second leg are curved inward toward the inside of the seal; and inserting the seal into the seal groove with the apex inwardly oriented towards the spin axis.

17. The method of claim 16, wherein said boundary between the rotors in on an outside surface of a cooling flow cavity.

18. A sealing system for sealing a boundary between sections of a rotating assembly, the assembly rotating about a spin axis, the sealing system comprising:

a seal groove having an opening facing inwardly towards the spin axis, the seal groove straddling the boundaries between the sections of the rotating assembly, the seal groove having a first rounded seal seat disposed between a first radial side and a first axial portion of the seal groove disposed on one side of the boundary, and a second rounded seal seat disposed between a second radial side and a second axial portion of the seal groove on a second side of the boundary;

a seal in a V shaped cross-section, the seal having:

a rounded apex radially oriented about the spin axis such that the apex is rounded towards an inside of the seal;

a first leg and a second leg, both of equal lengths and that extend away from both the rounded apex and spin axis;

a first foot at an end of the first leg and a second foot at the end of the second leg, wherein the first foot and the second foot are rounded inwardly toward the apex, whereby a pressure acting on said first leg and said second leg deform said first leg and the second leg inward, the deformation causing a force on the first foot and the second foot, pressing the first foot and the second foot against the first axial portion and the second axial portion, respectively, thereby increasing the surface area between the seal and the seal groove.

19. The sealing system of claim 18, wherein the first leg and the second leg are only linear from the rounded apex toward the first foot and the second foot when the rotating assembly is in a non-operational state.

20. A seal useable between a first section and a second section of a rotor of a turbofan engine, the first section and the second section rotating about a spin axis, the first section and the second having a seal groove with an opening facing inwardly towards the spin axis, the seal groove having a base straddling a boundary between the first section and the second section, the seal groove having a first rounded seal seat disposed between a first radial side and a first axial portion of the seal groove disposed on one side of the boundary, and a second rounded seal seat disposed between a second radial side and a second axial portion of the seal groove on a second side of the boundary, the seal comprising:

- a curved apex oriented towards the spin axis and curved towards an inside of the seal;
- a first leg and a second leg each extending symmetrically away from both the apex and spin axis on opposing sides of the apex;
- a first foot and a second foot that are respectively at ends of the first leg and the second leg, wherein the first foot and the second foot curve toward the inside of the seal;
- the first leg and the second leg extending only linearly from the curved apex to the first foot and the second foot when said rotating assembly in a non-operating state;
- the first leg and the second leg being curved inward toward the inside of the seal during an operational state;
- a curvature of the first foot is the same as a curvature of the second foot;
- the first foot is further configured to rest on at least the first axial portion and the first radial side of the seal groove; and
- the second foot is further configured to rest on at least the second axial portion and the second radial side of the seal groove.

* * * * *